(12) United States Patent
Ishii et al.

(10) Patent No.: US 8,967,870 B2
(45) Date of Patent: Mar. 3, 2015

(54) COMPOSITE SLIDE BEARING

(71) Applicants: Takuya Ishii, Mie (JP); Katsushi Takeo, Mie (JP); Ken Yasuda, Mie (JP)

(72) Inventors: Takuya Ishii, Mie (JP); Katsushi Takeo, Mie (JP); Ken Yasuda, Mie (JP)

(73) Assignee: NTN Corporation, Osaka (JP)

( * ) Notice: Subject to any disclaimer, the term of this patent is extended or adjusted under 35 U.S.C. 154(b) by 0 days.

(21) Appl. No.: 13/798,676

(22) Filed: Mar. 13, 2013

(65) Prior Publication Data

US 2013/0195388 A1 Aug. 1, 2013

Related U.S. Application Data

(63) Continuation-in-part of application No. PCT/JP2011/071466, filed on Sep. 21, 2011.

(30) Foreign Application Priority Data

Sep. 30, 2010 (JP) ................. 2010-220632

(51) Int. Cl.
*F16C 33/22* (2006.01)
*F16C 33/28* (2006.01)
*F16C 33/20* (2006.01)

(52) U.S. Cl.
CPC ............. *F16C 33/22* (2013.01); *F16C 33/201* (2013.01); *F16C 33/205* (2013.01); *F16C 33/208* (2013.01); *F16C 2208/02* (2013.01); *F16C 2208/36* (2013.01); *Y10S 384/911* (2013.01)
USPC ............ 384/297; 384/129; 384/276; 384/911

(58) Field of Classification Search
USPC ......... 384/129, 276, 279, 297, 300, 322, 902, 384/907, 908, 911
See application file for complete search history.

(56) References Cited

U.S. PATENT DOCUMENTS 4,169,637 A * 10/1979 Voitas ........................ 384/278
4,767,677 A * 8/1988 Kuwayama ................. 428/551
(Continued)

FOREIGN PATENT DOCUMENTS

| JP | 58160346 A | * | 9/1983 | .............. C08L 27/12 |
| JP | 60069324 A | * | 4/1985 | .............. F16C 33/20 |

(Continued)

OTHER PUBLICATIONS

International Search Report issued Dec. 13, 2011 in International (PCT) Application No. PCT/JP2011/071466.
(Continued)

*Primary Examiner* — Marcus Charles
(74) *Attorney, Agent, or Firm* — Wenderoth, Lind & Ponack, LLP.

(57) ABSTRACT

A high-precision slide bearing includes a substrate of sintered metal and a synthetic resin layer. The bearing can be used for rotary shafts in compressors of room air-conditioners or in transmissions of motor vehicles and construction machines to support relatively large radial and axial loads. The resin layer is integrally superposed on the radially inner surface of the sintered metal substrate of the slide bearing, which is a cylindrical member. The resin layer is made of a resin composition of an aromatic polyetherketone resin containing a fibrous filler. The fibrous filler is made up of fibers dispersed in the resin layer and oriented such that their length directions intersect the rotational direction of the bearing at angles of 45 to 90 degrees. The resin layer has a thickness of 0.1 to 0.7 mm.

18 Claims, 2 Drawing Sheets

(56) References Cited

U.S. PATENT DOCUMENTS

| | | | |
|---|---|---|---|
| 5,131,818 A * | 7/1992 | Wittkop et al. | 417/273 |
| 5,867,906 A * | 2/1999 | Klassen | 29/898.07 |
| 6,476,116 B1 * | 11/2002 | Egami et al. | 524/495 |
| 6,752,065 B2 * | 6/2004 | Sugioka et al. | 92/12.2 |
| 7,014,438 B2 * | 3/2006 | Fukuda et al. | 418/220 |
| 7,101,087 B2 * | 9/2006 | Hiramatsu et al. | 384/279 |
| 7,290,937 B2 * | 11/2007 | Takumi et al. | 384/297 |
| 2006/0251348 A1 * | 11/2006 | Egami et al. | 384/58 |
| 2007/0177833 A1 | 8/2007 | Egami et al. | |
| 2007/0232502 A1 * | 10/2007 | Tsutsui et al. | 508/104 |

FOREIGN PATENT DOCUMENTS

| | | | |
|---|---|---|---|
| JP | 01242662 A * | 9/1989 | C08L 71/00 |
| JP | 3-98326 | 10/1991 | |
| JP | 09-316323 | 12/1997 | |
| JP | 10-159854 | 6/1998 | |
| JP | 2003-239976 | 8/2003 | |
| JP | 2003-264984 | 9/2003 | |
| JP | 2005-337381 | 12/2005 | |

OTHER PUBLICATIONS

Written Opinion of the International Searching Authority issued Dec. 13, 2011 in International (PCT) Application No. PCT/JP2011/071466 (with English translation).

A Japanese Office Action issued Dec. 16, 2014 in corresponding Japanese Patent Application No. 2014-087201 (with partial English translation).

* cited by examiner

COMPOSITE SLIDE BEARING

The present application is a continuation-in-part application of PCT/JP2011/071466, filed Sep. 21, 2011.

TECHNICAL FIELD

This invention relates to a slide bearing which can be rotated with high precision while being stably lubricated, and particularly to a composite slide bearing including a substrate made of a sintered metal, and a resin layer formed on the substrate and made of an aromatic polyetherketone (PEK) resin.

BACKGROUND ART

It is known that a slide bearing made of a porous sintered metal impregnated with oil can be rotated with high precision. Since oil in the pores of the porous sintered metal is continuously supplied onto the sliding interface, frictional force can be stably kept at a low level.

The mating member with which this slide bearing is brought into contact is, in most cases, made of the same metal material as the bearing. Thus, there is neither the possibility of separation of the mating member from the bearing member, nor the possibility of these members "hugging" each other, due to a difference in linear expansion between these members. Thus by finishing this bearing with high accuracy, this bearing can be rotated with high precision.

Other self-lubricating slide bearings include one made of a resin containing tetrafluoroethylene resin (PTFE), graphite, a solid lubricant such as molybdenum disulfide, lubricating oil or wax.

If a slide bearing made of a porous sintered metal impregnated with oil is brought into sliding contact with a mating member, such as a shaft or a fixed member, that is made of a soft material, the bearing tends to abrade the mating member. If such a slide bearing runs out of lubricating oil, this could result in metal-to-metal contact.

If a slide bearing made of a resin, which has high sliding properties, is brought into a mating member made of a soft material, even though such a bearing does not attack the mating member, the bearing tends to "hug" the mating member such as the shaft when the resin expands or shrinks. In order to prevent such "hugging", it is necessary to leave a large gap between the bearing and the mating member. But such a large gap makes it difficult to rotate the bearing with high precision.

A high-precision slide bearing which is free of this problem is proposed in the below-identified Patent document 1 which includes a radially outer portion made of a metal, and a resin layer formed on the sliding portion of the radially outer portion by the insert molding of a resin material, in which fine recesses are formed at least on the portion of the surface of the radially outer portion that is in contact with the resin layer such that the sum of the apparent areas of the respective fine recesses on the surface of the radially outer portion accounts for 25 to 95% of the above portion of the surface of the radially outer portion. Further, the resin layer is configured such that the product of the linear expansion coefficient of the resin material forming the resin layer and the thickness of the resin layer is not more than 0.15.

Gate marks that develop while forming this high-precision slide bearing by injection molding may detrimentally influence the performance of the bearing. But disposing of such gate marks increases the production steps and thus reduces productivity.

In order to avoid this problem, the below-identified Patent document 2 proposes to form the resin layer on the sintered metal by insert molding in which molten resin is supplied through tunnel gates.

Such high-precision slide bearings are used as support bearings or carriage bearings for the photoconductor drum, developing unit or anchorage of copiers and printers.

PRIOR ART DOCUMENTS

Patent Documents

Patent document 1: JP Patent Publication 2003-239976A
Patent document 2: JP Patent Publication 2005-337381A

SUMMARY OF THE INVENTION

Object of the Invention

One problem with this type of conventional high-precision slide bearings is that their resin layers are not sufficiently wear-resistant and thus these bearings are not suitable for use in an environment where the bearings are rotated at high speed under high loads.

For example, it is difficult to use these conventional high-precision slide bearings to support rotary shafts of compressors in room air-conditioners and car air-conditioners, and rotary shafts of transmissions of motor vehicles and construction machines such that these bearings can support these rotary shafts so as to be rotatable with high precision while supporting large radial loads and axial loads.

An object of the present invention is to provide a high-precision slide bearing which is free of the above-mentioned problems, and which includes a substrate of sintered metal and a synthetic resin layer such that accurate and stable torque is obtainable, and such that this bearing can be used e.g. in transmissions of motor vehicles and construction machines to support relatively large radial and axial loads.

In other words, the object of the invention is to provide a high-precision slide bearing which is more load-resistant, heat-resistant and wear-resistant, and lower in friction, than conventional high-precision slide bearings.

Means for Achieving the Object

In order to achieve this object, this invention provides a composite slide bearing comprising a substrate made of a sintered metal, and a resin layer fixedly superposed on the substrate, wherein the resin layer comprises a resin composition comprising an aromatic polyetherketone resin and a fibrous filler dispersed in the aromatic polyetherketone resin (this composition is hereinafter referred to as "PEK resin composition"), wherein the fibrous filler comprises fibers which are oriented such that length direction of each of the fibers intersects a rotational direction of the bearing at an angle of 45 to 90 degree, and wherein the resin layer has a thickness of 0.1 to 0.7 mm.

In the composite slide bearing according to this invention, since fibrous filler is present in the aromatic polyetherketone resin forming the resin layer such that the fibers forming the fibrous filler are dispersed in the resin so as to be oriented such that their length directions intersect the rotational direction of the bearing at angles of 45 to 90 degrees, pointed ends of the fibers are less likely to abrade the mating member, thus reducing the friction coefficient while the rotating. This in turn makes it possible to keep the torque value at a low level with minimum fluctuations in toque. Thus, the composite slide bearing according to the present invention, which includes the substrate of sintered metal, and the synthetic resin layer, can be rotated with high precision with stable torque.

In order to disperse the fibrous filler in the resin layer such that the fibers are reliably oriented in the desired manner, the resin layer is preferably superposed on the substrate by injection molding.

For the same purpose, the resin layer further preferably has a thickness which is one-eighth to a half of the thickness of the substrate in the radial direction of the bearing. In order to disperse the fibers so as to be oriented at intersecting angles of 45 to 90 degrees by injection molding, the fibers forming the fibrous filler preferably has an average length of 0.02 to 0.2 mm.

For higher bond strength between the resin layer and the substrate, and in order for the substrate to have required thermal conductivity, the substrate preferably has a theoretical density ratio of 0.7 to 0.9.

By using the above-described type of substrate, heat from the resin layer can be more easily dissipated into the atmosphere through the substrate. The substrate has protrusions and recesses on its surface, which increase the surface area and thus increase the anchoring effect, i.e. bond strength, between the substrate and the resin layer.

By superposing the resin layer, which is made of the resin composition of an aromatic polyetherketone resin, by injection molding, especially by insert molding, the resin layer deeply engages the protrusions and recesses on the surface of the sintered metal substrate. This increases the actual bond area, and thus the bond strength, between the substrate and the resin layer. Since the actual bond area between the resin layer and the substrate is large with no gap therebetween, heat is more easily conducted to the substrate from the resin layer.

Since the resin layer is formed, to a thin thickness, on the surface of the sintered alloy substrate, which is formed with high dimensional accuracy, the bearing can be manufactured with high dimensional accuracy.

By setting the average length of the carbon fibers in the resin composition of an aromatic polyether ketone to 0.02 to 0.2 mm, it is possible to ensure stable flowability of molten resin even when forming a thin resin layer of 0.1 to 0.7 mm by insert molding.

By setting the melt viscosity at a resin temperature of 380° C. and at a shear rate of 1000 $s^{-1}$ to 50 to 200 Pa·s, a thin resin layer of 0.1 to 0.7 mm can be smoothly formed on the surface of the sintered metal substrate by insert molding.

Oil could reduce the bond strength between the resin layer and the substrate when forming the resin layer on the sintered metal substrate. But since the substrate is not impregnated with oil when forming the resin layer on the substrate, the bond strength therebetween remains high.

By using a sintered alloy of which the main component is iron or a ferrous sintered alloy containing 10% or less of copper as the material of the bearing substrate, the bond strength between resin layer and the bearing substrate improves.

By setting the shear bond strength between the bearing substrate and the resin layer to be 2 MPa or over, the resin layer never peels off from the bearing substrate even when the slide bearing is used under high-pressure, high-velocity conditions.

In the composite slide bearing according to the present invention, since a resin composition of an aromatic polyetherketone is used for the resin layer, the resin layer shows excellent friction/wear properties, as well as excellent resistance to seizure and various chemicals and oil.

By steaming the sintered metal of which the main component is iron, it is possible to remove foreign matter (such as oil) adhered to the substrate during sintering (molding or sizing). This improves the bond strength between the resin layer and the bearing substrate.

The resin composition preferably comprises, as essential components, 5 to 30% by volume of carbon fiber, and 1 to 30% by volume of tetrafluoroethylene, the balance being an aromatic polyetherketone. The carbon fiber is preferably PAN carbon fiber.

Preferably, the substrate is a cylindrical member with or without a flange, and the resin layer is formed on at least one of a radially inner surface, a radially outer surface and end surfaces, of the substrate.

According to the present invention, since a resin layer made of a PEK resin composition is formed on the sintered metal substrate to the thickness of 0.1 to 0.7 mm, if the composite slide bearing is used as a cylindrical bearing for supporting radial loads, as a bearing for supporting radial and axial loads, or as a thrust washer for supporting axial loads, the slide bearing can dissipate heat efficiently, is less likely to be deformed or become worn, and shows a low friction coefficient.

This composite slide bearing can be used in an environment where there exists oil such as hydraulic oil, refrigerant oil, lubricating oil, transmission oil, engine oil or brake oil, or grease.

Advantages of the Invention

The composite slide bearing according to this invention includes a sintered metal substrate, and a resin layer of a resin composition of an aromatic polyetherketone containing a fibrous fitter oriented in a predetermined direction formed on the substrate to a predetermined thickness. The bearing thus shows excellent load resistance, heat resistance and wear resistance, and is low in friction. By orienting the fibers of the fibrous filler in the predetermined direction, the fibers are less likely to abrade the mating member, which makes it possible to keep the friction coefficient stably at a low level. This in turn makes it possible to achieve accurate and stable torque.

By setting the thickness of the resin layer to one-eighth to a half of the thickness of the sintered metal substrate or to a small thickness of 0.1 to 0.7 mm, frictional heat generated at the friction surface can be easily and efficiently dissipated into the bearing substrate. This prevents heat buildup, and improves load resistance and the load resistance is less likely to change even under high surface pressure. This in turn reduces the actual frictional surface area, reduces frictional force, frictional heat buildup, and wear, and curbs a temperature rise at the frictional surface.

By forming the resin layer from a resin composition of an aromatic polyetherketone resin, which is sufficiently heat-resistant such that the bearing can be used continuously at 250° C., the composite slide bearing shows excellent friction/wear properties and creep resistance.

Since the sintered metal has a theoretical density ratio of 0.7 to 0.9, it is possible to form recesses and protrusions on the surface which is necessary to ensure sufficient bond strength, and also to ensure sufficient thermal conductivity of the substrate.

Since the resin composition comprises, as essential components, 5 to 30% by volume of carbon fiber, and 1 to 30% by volume of tetrafluoroethylene, the balance being an aromatic polyetherketone, the resin layer is less likely to be deformed or become worn, less likely to abrade the mating member, and is resistant e.g. to oil even under high-pressure, high-velocity conditions.

By setting the melt viscosity at a resin temperature of 380° C. and at a shear rate of $1000 \text{ s}^{-1}$ to 50 to 200 Pa·s, a thin resin layer of 0.1 to 0.7 mm can be smoothly formed on the surface of the sintered metal substrate by insert molding.

By using PAN carbon fiber as the above carbon fiber, the elastic modulus of the resin layer improves, and the resin layer becomes less likely to be deformed or become worn. Further, the actual frictional surface area as well as frictional heat buildup decrease.

By providing the composite slide bearing of the invention with the above-described predetermined resin layer, this bearing can support radial loads alone, axial loads alone, or both radial and axial loads simultaneously, and thus can be used for multiple purposes. This bearing can withstand high loads while maintaining accurate and stable rotation when used as a liquid lubricated bearing lubricated by oil or grease.

DESCRIPTION OF THE NUMERALS 1, 4, 6, 8. Substrate of sintered metal
2, 5, 7, 9. Resin layer
3. Fibrous filler

BEST MODE FOR EMBODYING THE INVENTION

The embodiments of the present invention are now described with reference to the drawings.

Figure 1:
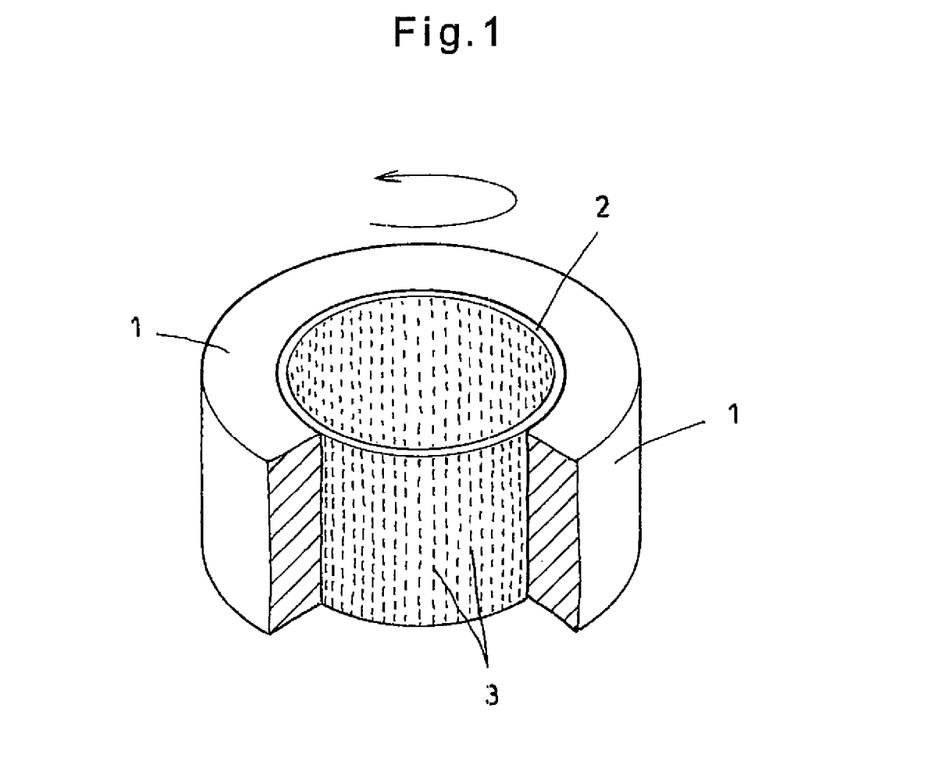
FIG. 1 is a partially cutaway perspective view of a composite rolling bearing of a first embodiment.
Figure 2:
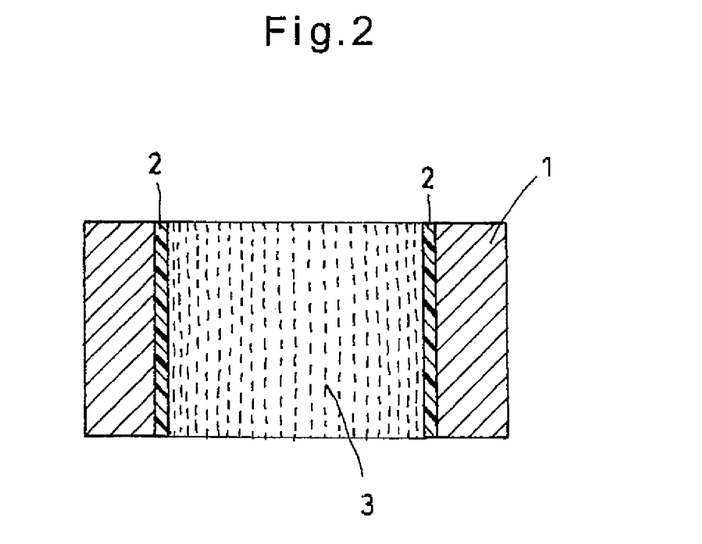
FIG. 2 is a sectional view of the composite rolling bearing of the first embodiment.

FIGS. 1 and 2 show the cylindrical composite slide bearing of the first embodiment, which includes a substrate 1 made of a sintered metal, and a resin layer 2 integrally superposed on the radially inner surface of the substrate 1 and made of a resin composition in the form of an aromatic polyetherketone resin containing a fibrous filler. The fibrous filler 3 is made up of fibers that are dispersed in the resin layer such that their longitudinal directions form an intersecting angle of 90 degrees on the average with the rotational direction of the bearing (i.e. their longitudinal directions are perpendicular to the rotational direction of the bearing). The resin layer 2 has a thickness of 0.1 to 0.7 mm.

Figure 3:
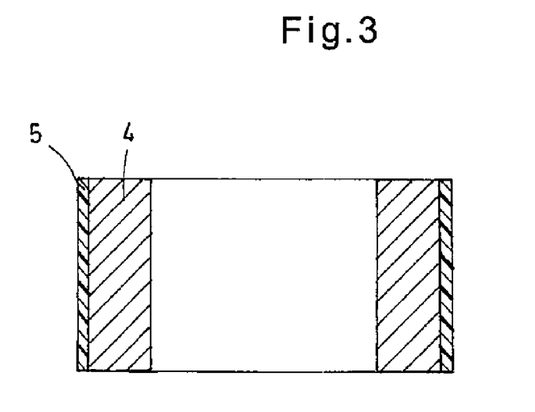
FIG. 3 is a sectional view of a composite rolling bearing of a second embodiment.

FIG. 3 shows the cylindrical bearing of the second embodiment, which includes a substrate 4 made of a sintered metal, and a resin layer 5 formed on the radially outer side of the substrate 4. This bearing can be used to support radial loads too.

Figure 4:
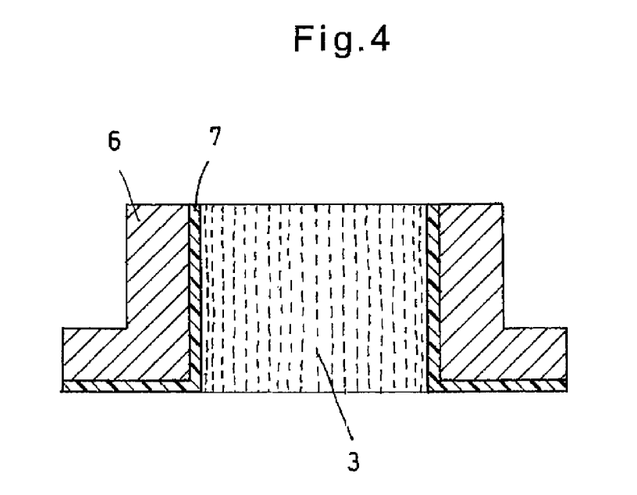
FIG. 4 is a sectional view of a composite rolling bearing of a third embodiment.

FIG. 4 shows the bearing of the third embodiment, which includes a cylindrical substrate 6 having a flange and made of a sintered metal, and a resin layer 7 formed on the radially inner side of the substrate 6. This bearing can support radial loads and axial loads simultaneously.

Figure 5:
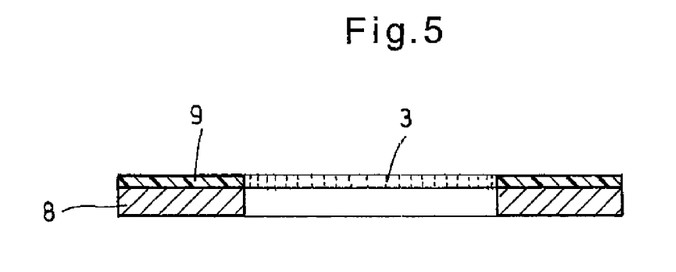
FIG. 5 is a sectional view of a composite rolling bearing of a fourth embodiment.

FIG. 5 shows the composite slide bearing of the fourth embodiment, which includes a substrate 8 in the form of a thrust washer made of a sintered metal, and a resin layer 9 formed on one side of the substrate 8.

When forming, by superposing, the resin layers 2, 5, 7 and 9 on the predetermined surfaces of the respective substrates 1, 4, 6 and 8, in order to allow the respective molten resins to flow in the direction perpendicular to moving direction of the slide bearing, pin gates, disk gates, film gates, etc. may be provided so that the molten resins flow from one to the other end surfaces of each of the bearings of FIGS. 1 to 4.

For the thrust washer of FIG. 5, disk gates can be provided on the radially inner side.

If any of these bearings is used at a slide portion where there exists oil such as hydraulic oil, refrigerant oil, lubricating oil, transmission oil, engine oil or brake oil, or grease, lubricating grooves are preferably formed on the friction surface of the resin layer to attain low-friction low-wear properties.

In any of these embodiments, the resin layer is formed on the substrate of sintered metal such that the melt flow direction of the resin when forming the resin layer forms an angle of 45 to 90 degrees with the moving direction of the bearing. The surface of the resin layer serves as a friction surface. Since the substrate is made of sintered metal, the resin layer is strongly bonded to the substrate, and also, the frictional heat can be efficiently dissipated through the substrate.

Since the resin layer is made of a PEK resin composition, the composite slide bearing is high in heat resistance (with the continuously usable temperature at 250° C.), oil resistance, chemical resistance, creep resistance and frictional/wear resistance. Since PEK resin is high in toughness and mechanical properties at high temperature, and also shows excellent fatigue resistance and shock resistance, the resin layer never peels off from the substrate of sintered metal due e.g. to frictional force, impact or vibration during use.

By adding to the PEK resin a fibrous filler (such as glass fiber, carbon fiber, aramid fiber or whiskers), a solid lubricant (such as PTFE, graphite or molybdenum disulfide), and/or an inorganic filler (such as calcium carbonate, calcium sulfate, mica or talc), creep resistance and frictional/wear resistance (both without lubrication and with oil lubrication) improve.

Fibrous fillers, inorganic solid lubricants (such as graphite and molybdenum disulfide) and inorganic fillers all serve to reduce the shrinkage rate of the PEK resin composition when formed into the resin layer, thus minimizing internal stress of the resin layer when the resin layer is formed by insert molding together with the bearing substrate.

A solid lubricant (such as PTFE, graphite or molybdenum disulfide) serves to reduce the friction of the resin layer even if lubricating oil is scarcely present, thus improving resistance to seizure.

Since the resin layer is formed such that the melt flow direction of the resin when forming the resin layer forms an angle of 45 to 90 degrees with the moving direction of the slide bearing, fibers forming the needle-like or fibrous filler (such as glass fibers, carbon fibers, aramid fibers or whiskers) are oriented at angles of 45 to 90 degrees relative to the moving direction of the bearing. These (needle-like or other) fibers have pointed ends having an angle of 90° or less. Thus, if these fibers are oriented such that their pointed ends substantially face the moving direction of the bearing, these pointed ends of the fibers tend to abrade or otherwise physically damage the member that is in sliding contact with the bearing, thus destabilizing the friction coefficient. But according to the present invention, since the fibers forming the filler are oriented at angles of 45 to 90 degrees relative to the moving direction of the bearing, the fibers are less likely to abrade or otherwise damage the member in sliding contact with the bearing. This stabilizes the friction coefficient. The fibers forming the filler are preferably oriented at an angle as close to 90 degrees as possible in order to minimize damage to the mating member by the fibers, thereby stabilizing the friction coefficient. Thus, the fibers are most preferably oriented at angles of 80 to 90 degrees relative to the moving direction of the bearing.

The thickness of the resin layer, i.e. its dimension in the direction in which loads are applied to the composite slide bearing (i.e. radial or axial dimension), should be 0.1 to 0.7 mm, and should be one-eighth to a half of the thickness of the substrate of sintered metal.

If the thickness of the resin layer is larger than 0.7 mm and/or larger than half the thickness of the substrate of the sintered metal, frictional heat generated at the friction surface is less likely to be dissipated into the substrate of the bearing, so that the temperature at the friction surface tends to rise. Also, the resin layer tends to be deformed more markedly under loads, and the actual contact area increases, which in turn increases the frictional force and frictional heat, and reduces resistance to seizure. If the thickness of the resin layer is less than 0.1 mm and/or less than one-eighth of the thickness of the substrate of sintered metal, the durability of the bearing when used for a long time, i.e. its lifespan tends to be short.

In order to form the resin layer on the substrate of sintered metal, a raw material formed by injection-molding or extrusion-molding the PEK resin composition may be fixed to the substrate by heat fusing, adhesive bonding or press-fitting, or by inserting the substrate of sintered metal in a mold and injection-molding the PEK resin composition. The thus formed resin layer may be finished to a required thickness by machining.

The resin layer is preferably formed by insert molding because this is the least expensive method and still provides relatively high dimensional accuracy. If the resin layer is formed by insert molding, considering e.g. injection moldability, the thickness of the resin layer is preferably 0.1 to 0.7 mm. It is difficult to form a resin layer having a thickness of less than 0.1 mm by insert molding. If the resin layer is formed to a thickness of over 0.7 mm by insert molding, sink marks tend to develop, thus deteriorating dimensional accuracy. Considering also the necessity to efficiently dissipate frictional heat into the substrate of the bearing, the thickness of the resin layer is preferably 0.2 to 0.5 mm.

If higher dimensional accuracy is required, the resin layer may be finished to the required thickness by machining. Still, the manufacturing cost of the bearing is relatively low.

The substrate of sintered metal may be made of an iron-family metal, a copper-iron-family metal, a copper-family metal or a stainless steel. If the bearing is formed by injection-molding the PEK resin composition with the substrate of sintered metal inserted in a mold, the mold is heated to 160 to 200° C. and resin composition is heated to 360 to 410° C.

If oil is adhered to the sintered metal or the sintered metal contains oil, such oil is decomposed and gasified during injection molding, leaving oil residue on the interface. Such oil residue tends to lower the bond strength between the resin layer and the sintered metal.

Thus, the substrate has to be made of a sintered metal not impregnated with oil. If oil is used during forming or sizing of the sintered metal, oil has to be later removed by e.g. rinsing the substrate with a solvent so that the completed sintered bearing does not contain oil.

The sintered metal forming the substrate according to the present invention has a theoretical density ratio of 0.7 to 0.9. The theoretical density ratio is the ratio of the actual density of the material to its theoretical density (its density if its porosity is supposed to be zero percent). If the theoretical density ratio is less than 0.7, the strength of the sintered metal is insufficient so that the sintered metal tends to crack during insert molding due to the injection molding pressure. If the theoretical density ratio is over 0.9, recesses and protrusion decrease in size, reducing the surface area and thus the anchoring effect. This in turn reduces the bond strength between the substrate and the PEK resin layer. The theoretical density ratio of the sintered metal is preferably 0.72 to 0.84.

Since the main component of the sintered metal forming the substrate of the present invention is iron, the bond strength between the substrate and the PEK resin layer is high. Since the bond strength between copper and resin is lower than the bond strength between iron and resin, the content of copper in the substrate is preferably 10% or less, more preferably 5% or less.

By steaming the sintered metal of which the main component is iron, it is possible to remove oil and any other foreign matter unintentionally adhered to or impregnated into the substrate during molding or sizing. This reduces variation in bond strength between the substrate and the PEK resin layer, and stabilizes the bond strength. Steaming also provides the substrate of sintered metal with protection against rust. Steaming conditions are not particularly limited. But most ordinarily, steam heated to about 500° C. is sprayed.

The shear bond strength between the substrate of sintered metal and the PEK resin layer, of the composite slide bearing according to the invention is preferably 2 MPa or over (safety factor is 2 or over if the surface pressure is 10 MPa and the friction coefficient is 0.1) in order to ensure sufficient bond strength relative to the frictional force during use. To further increase the safety factor, the shear bond strength is more preferably 3 MPa or over.

In order to further increase the shear bond strength between the substrate of sintered metal and the PEK resin layer, physical means for preventing separation and/or relative rotation, such as protrusions/recesses or grooves, may be formed on the surface of the substrate on which the resin layer is to be formed.

The PEK resin composition used in the present invention contains, as essential components, 5 to 30% by volume of carbon fiber, and 1 to 30% by volume of a PTFE resin, the balance being a PEK resin.

The PEK resin may be polyetheretherketone (PEEK) resin, polyetherketone (PEK) resin, or polyetherketoneetherketoneketone (PEKEKK) resin. Commercially available PEEK includes VICTREX PEEK (such as 90P, 150P, 380P and 450P), made by Victrex, "KetaSpire" PEEK (such as KT-820P and KP-880P), made by Solvay Specialty Polymers, and VESTAKEEP (such as 1000G, 2000G, 3000G and 4000G), made by Daicel-Evonik Ltd.

Commercially available PEK includes VICTREX HT, made by Victrex. Commercially available PEKEKK includes VICTREX ST, made by Victrex.

In order for the PEK resin composition to have a melt viscosity of 50-200 Pa·s with the resin temperature at 380° C. and the shear rate at $1000\ s^{-1}$, a PEK resin is preferably used which has a melt viscosity of 150 Pa·s or less under the above conditions. Such PEK resins include VICTREX PEEK 150P, 90P, 150G and 90G, made by Victrex, and KetaSpire PEEK KT-880P, made by Solvay Specialty Polymers.

In order to form a resin layer having a thickness of 0.2 to 0.5 mm by insert molding, the melt viscosity of the PEK resin composition is preferably adjusted to 50-200 Pa·s with the resin temperature at 380° C. and the shear rate at 1000 s$^{-1}$ for precise molding and to orient the fibers forming the filler at angles within the predetermined range. For this purpose, a PEK resin is preferably used which has a melt viscosity of 130 Pa·s or less under the above conditions. Such PEK resins include VICTREX PEEK 90P and 90G, made by Victrex.

If the melt viscosity is less than the above predetermined range (which means that the viscosity is high) or is over this predetermined range (which means that the viscosity is low), it becomes difficult to achieve the expected results regarding precise molding and orientation of the fibers forming the filler.

Carbon fiber as typical fiber forming the fibrous filler used in the present invention may be carbon pitch fiber or carbon PAN fiber as a raw material. But carbon PAN fiber is preferable because carbon PAN fiber has a higher elastic modulus. The firing temperature of the fibrous filler is not particularly limited but the fibrous filler is preferably in the form of a carbide obtained by firing at 1000 to 1500° C., rather than in the form of a graphitized material obtained by firing at a higher temperature of 2000° C. or over because the former is less likely to abrade the metal mating member with which the bearing is brought into sliding contact even under high-pressure, high-velocity conditions.

The carbon fiber may be either chopped fiber or milled fiber. But in order to stably form such a thin resin layer, milled fiber having a fiber length of less than 1 mm is preferably used.

The carbon fibers have an average diameter of preferably 20 μm or less, more preferably 5 to 15 μm. If the average diameter is larger than this range, the load resistance scarcely improves due to extreme pressures, and also, the member with which the bearing is brought into sliding contact tends to become severely worn if this member is made of an aluminum alloy or an unhardened steel.

The carbon fibers are preferably 0.02 to 0.2 mm long on the average. If they are shorter than 0.02 mm on the average, they cannot sufficiently reinforce the bearing, and thus cannot sufficiently improve the creep resistance and wear resistance of the bearing. If the average length of the carbon fibers is larger than 0.2 mm, the ratio of this average length to the thickness of the resin layer tends to be too high to form a sufficiently thin resin layer. Especially if the resin layer is formed to a thickness of 0.2 to 0.7 mm by insert molding, if the fiber length is longer than 0.2 mm, it becomes difficult to form such a thin resin layer. In order to more stably form such a thin resin layer, the average fiber length is more preferably 0.02 to 0.1 mm.

Carbon fiber is preferable because carbon fiber show a strong tendency to be oriented in the flow direction of the molten resin when forming the resin layer.

The fibrous filler should be oriented so as to intersect the moving direction of the slide bearing at an intersecting angle of 45 degrees, preferably at an intersecting angle as close to 90 degrees as possible so that the pointed ends of the fibers face perpendicular the moving direction of the bearing. This reduces wear of the mating member by the pointed ends of the fibers, thus stabilizing the friction coefficient.

In this case, 50% or more of the fibers forming the fibrous filler that are present on any section of the resin layer preferably have an intersecting angle within the above predetermined intersecting angle range, or alternatively, the fibers forming the fibrous filler preferably have an average intersecting angle within the above predetermined intersecting angle range.

In particular, if carbon fibers are selected, which are small in diameter and relatively short, and if the intersecting angle is less than 45 degrees such that the pointed ends of the fibers face the moving direction of the slide bearing, the fibers tend to markedly damage the mating member. Thus, if thin and short carbon fibers are used, it is extremely beneficial to determine the flow direction of the molten resin when forming the resin layer so as to form an angle as close to 90 degrees as possible with the moving direction of the slide bearing, thereby orienting the fibers such that their length directions intersect the rotational direction of the bearing at an intersecting angle of 45 to 90 degrees, in order to improve the durability of the bearing and to stably keep the bearing torque at a low level.

Commercially available pitch carbon fiber which can be used in the present invention includes Kureca Chop M-101S, M-107S, M-101F, M-201S, M-207S, M-2007S, C-103S, C-106S and C-203S, made by Kureha Corporation. Commercially available PAN carbon fiber which can be used in the present invention includes TENAX HTA-CMF0160-OH, HTA-CMF0040-OH, HTA-C6 and HTA-C6-S, made by Toho Tenax Co., Ltd., and Torayca MLD-30, MLD-300, T008 and T010, made by Toray Industries, Inc.

PTFE used in this invention may be any of molding powder produced by suspension polymerization, fine powder produced by emulsion polymerization, and recycled PTFE. But in order to stabilize flowability of the PEK composition, recycled PTFE is preferably used because recycled PTFE is less likely to become fibrous due to shearing during molding, and thus less likely to increase the melt viscosity of the composition. Recycled PTFE refers to heat-treated powder (i.e. powder subjected to heat history), and powder irradiated with gamma rays or electron beams, and includes powder obtained by subjecting molding powder or fine powder to heat treatment, powder obtained by further irradiating this heat-treated powder with gamma rays or electron beams, powder obtained by pulverizing a formed material of molding powder or fine powder, powder obtained by further irradiating this pulverized powder with gamma rays or electron beams, and powder obtained by irradiating molding powder or fine powder with gamma rays or electron beams.

PTFE irradiated with gamma rays or electron beams is especially preferable because such PTFE does not coagulate, does not become fibrous at all at the melting temperature of the PEK resin, has self-lubricating properties, and can stably improve the flowability of the PEK resin composition.

Commercially available PTFE includes KTL-610, KTL-450, KTL-350, KTL-8N and KTL-400H, made by Kitamura Limited, Teflon 7-J and TLP-10, made by DuPont-Mitsui Fluorochemicals Co., Ltd., Fluon G163, L150J, L169J, L170J, L172J and L173J, made by Asahi Glass Co., Ltd., Polyflon M-15 and Lubron L-5, made by Daikin Industries, Ltd. PTFE used in the present invention may be one modified by a perfluoroalkylether group, a fluoroalkyl group, or a side chain group having another fluoroalkyl.

PTFE irradiated with gamma rays or electron beams includes KTL-610, KTL-450, KTL-350, KTL-8N and KTL-8F, made by Kitamura Limited, and Fluon L169J, L170J, L172J and L173J, made by Asahi Glass Co., Ltd.

The PEK resin composition preferably contains, as essential components, 5 to 30% by volume of carbon fiber, and 1 to 30% by volume of PTFE, the balance being PEK resin, for the following reasons.

If the carbon fiber content is higher than 30% by volume, flowability of molten resin tends to be extremely low, making it difficult to form a sufficiently thin resin layer, and also the carbon fiber tends to severely abrade the mating member with which the bearing is brought into sliding contact if the mating member is made of an aluminum alloy or unhardened steel. If the carbon fiber content is lower than 5% by volume, the carbon fiber cannot sufficiently reinforce the composition and thus cannot sufficiently improve the creep resistance and wear resistance.

If the content of the PTFE is higher than 30% by volume, the wear resistance and creep resistance tend to be lower than the required levels. If the PTFE content is lower than 1% by volume, the PTFE cannot impart the required lubricating properties to the composition and thus cannot sufficiently improve the sliding properties.

The lubricating resin composition may contain any of the following and other known resin additives to such an extent that the addition of such additives has no detrimental influence on the object of the invention:
(1) Friction improvers, such as graphite, boron nitride, molybdenum disulfide and tungsten disulfide
(2) Colorants, such as carbon powder, iron oxide and titanium oxide
(3) Thermal conductivity improvers, such as graphite and metal oxide powder How these materials are mixed and kneaded together is not limited. For example, only powder materials may be mixed together in a dry state in a Henschel mixer, a bowl mixer, a ribbon blender, a Lodige mixer or an ultra-Henschel mixer, and then melted and kneaded together in a melt extruder such as a twin-screw extruder to form pellets (granules). The filler may be added to the powder materials while they are being melted and kneaded together in e.g. a twin-screw extruder by side feeding. The pellets are then formed into the resin layer by any of extrusion molding, injection molding or heat compression molding. But injection molding is preferable for higher production efficiency. The thus formed resin layer may be subjected to e.g. annealing to improve its physical properties.

The composite slide bearing according to the present invention includes a resin composition having a thickness of 0.1 to 0.7 mm, and a substrate of a sintered metal. Since the resin layer is a PEK resin composition formed with a friction surface, the bearing is high in wear/friction resistance and creep resistance. Since the substrate is made of a sintered metal, the substrate can efficiently dissipate frictional heat and can withstand higher loads. This in turn makes it possible to use the slide bearing of the invention e.g. in a compressor of a room air-condition or a car air-conditioner, or in a transmission of a motor vehicle or a construction machine.

The composite slide bearing according to the invention is not particularly limited in shape and can be configured to support radial loads only, axial loads only, or both radial and axial loads. The location of the resin layer on the substrate is also not particularly limited.

Example 1

Examples (of the Invention) 1 to 22 and Comparative Examples 1 to 13

Substrates used in Examples of the invention (hereinafter simply referred to as "Examples") and Comparative Examples are listed in Table 1. Raw materials used in the resin layers of Examples and Comparative Examples are listed below.

The melt viscosity values of the respective aromatic polyetherketone resins were measured by a capillograph made by Toyo Seiki Seisakusho, Ltd. with a capillary of 1 mm in diameter and 10 mm long, at a resin temperature of 380° C. and a shear velocity of 1000 s$^{-1}$.
(1) Aromatic Polyetherketone Resin [PEK-1]
  VICTREX PEEK 90P (melt viscosity: 105 Pa·s), made by Victrex
(2) Aromatic Polyetherketone Resin [PEK-2]
  VICTREX PEEK 150P (melt viscosity: 145 Pa·s), made by Victrex
(3) Aromatic Polyetherketone Resin [PEK-3]
  VICTREX PEEK 450P (melt viscosity: 420 Pa·s), made by Victrex
(4) PAN Carbon Fiber [CF-1]
  Torayca MLD-30 (0.03 mm in average fiber length and 7 μm in average fiber diameter), made by made by Toray Industries, Inc.
(5) PAN Carbon Fiber [CF-2]
  TENAX HTA-CMF0160-OH (0.16 mm in fiber length and 7 μm in fiber diameter), made by made by Toho Tenax
(6) Pitch Carbon Fiber [CF-3]
  Kureca Chop M-101S (0.13 mm in average fiber length and 14.5 μm in average fiber diameter), made by made by Kureha Corporation
(7) Pitch Carbon Fiber [CF-4]
  Kureca Chop M-107S (0.7 mm in average fiber length and 14.5 μm in average fiber diameter), made by Kureha Corporation
(8) Calcium Carbonate Powder [$CaCO_3$]
  NA600 (3 μm in average particle diameter), made by Nitchitsu Co., Ltd.
(9) Graphite [GRP]
  TIMREX KS6 (6 μm in average particle diameter), made by Timcal Japan, Ltd.
(10) Tetrafluoroethylene Resin [PTFE]
  KTL-610 (recycled PTFE), made by Kitamura Limited
(11) Bronze Powder (BRO)
  AT-350 (bronze-tin alloy), made by Fukuda Metal Foil & Powder Co., Ltd.

TABLE 1

Bearing Substrate (specifications A to I of embodiments and specifications J, K of comparative examples)

| | Material | Main component | Copper content wt % | Density g/cm$^3$ | Theoretical density ratio of material | Steaming |
|---|---|---|---|---|---|---|
| Substrate A | Sintered alloy | Iron | 5 | 5.5 | 0.70 | Performed |
| Substrate B | Sintered alloy | Iron | 5 | 5.7 | 0.72 | Performed |
| Substrate C | Sintered alloy | Iron | 5 | 6.6 | 0.84 | Not performed |
| Substrate D | Sintered alloy | Iron | 5 | 7.0 | 0.89 | Not performed |
| Substrate E | Sintered alloy | Iron | — | 6.2 | 0.79 | Performed |
| Substrate F | Sintered alloy | Iron | 35 | 6.5 | 0.78 | Not performed |
| Substrate G | Sintered alloy | Iron | 10 | 6.2 | 0.78 | Not performed |

TABLE 1-continued

Bearing Substrate (specifications A to I of embodiments and specifications J, K of comparative examples)

|  | Material | Main component | Copper content wt % | Density g/cm³ | Theoretical density ratio of material | Steaming |
|---|---|---|---|---|---|---|
| Substrate H | Sintered alloy | Copper | Main component | 6.4 | 0.73 | Not performed |
| Substrate I | Sintered alloy | Iron | 5 | 7.3 | 0.93 | Not performed |
| Substrate J | Sintered alloy | Iron | 5 | 5.3 | 0.67 | Performed |
| Substrate K | Steel material* (S45C) | Iron | — | 7.89 | 1 | — |

*Cutting-processed product formed from cylindrical rod

Raw materials were blended in a dry state in a Henschel dry mixer at the rates (in percent by volume) shown in Tables 2 and 3, and the mixture was melted and kneaded together in a twin-screw extruder to form pellets.

From the pellets, a resin layer was formed on the radially inner surface of a cylindrical bearing substrate (31 mm in inner diameter, 35 mm in outer diameter and 20 mm long) to a thickness of 0.2 to 1 mm, by insert molding, at a resin temperature of 380 to 400° C. and at a mold temperature of 180° C., producing a cylindrical composite slide bearing (30 mm in inner diameter, 35 mm in outer diameter, and 20 mm long) as shown in FIG. 1. In forming the composite slide bearing, the resin layer was formed by injection molding with nine pin gates provided on the end surfaces of the bearing such that molten resin flows in the direction perpendicular to the moving direction of the bearing.

TABLE 2

Resin Composition (for embodiments)

| Raw Material | a | b | c | d | e | f | g | h | i |
|---|---|---|---|---|---|---|---|---|---|
| (1) PEK-1 | 80 | 78 | 85 | 65 | — | — | 80 | 82 | 82 |
| (2) PEK-2 | — | — | — | — | 80 | — | — | — | — |
| (3) PEK-3 | — | — | — | — | — | 80 | — | — | — |
| (4) CF-1 | 10 | 20 | 5 | 10 | — | — | — | 5 | 5 |
| (5) CF-2 | — | — | — | — | 10 | — | — | — | — |
| (6) CF-3 | — | — | — | — | — | 10 | — | — | — |
| (7) CF-4 | — | — | — | — | — | — | 10 | — | — |
| (8) CaCO3 | — | — | — | — | — | — | — | 3 | — |
| (9) GRP | — | — | — | — | — | — | — | — | 3 |
| (10) PTFE | 10 | 2 | 10 | 25 | 10 | 10 | 10 | 10 | 10 |

TABLE 3

Resin Composition (for comparative examples)

| Raw Material | j | k | l | m | n | o | p | q |
|---|---|---|---|---|---|---|---|---|
| (1) PEK-1 | 65 | 88 | 60 | 80 | 80 | 75 | 80 | 100 |
| (4) CF-1 | 35 | 2 | 5 | — | — | — | — | — |
| (8) CaCO3 | — | — | — | 10 | — | — | — | — |
| (9) GRP | — | — | — | — | 10 | — | — | — |
| (10) PTFE | — | 10 | 35 | 10 | 10 | 5 | 20 | — |
| (11) BRO | — | — | — | — | — | 20 | — | — |

(1) Shear Bond Strength Test

A shear bond strength test was performed on cylindrical composite slide bearings in which the resin layer of Example a was formed on the radially inner surface of each of the bearing substrates of Table 1 to the thickness of 0.5 mm, by insert molding. In the test, with the bearing substrate fixed in position, axial shear force was applied to the radially inner resin layer, and the load at which the resin layer peeled off from the bearing substrate was measured. The shear bond strength of each bearing, which is the above load divided by the apparent bonded area between the resin layer and the bearing substrate, is shown in Table 4.

For each example, 30 bearings were prepared by insert molding. Table 4 shows, for each example, whether or not cracks were found on the bearing substrate of more than one of the 30 bearings.

TABLE 4

| Embodiment No. (resin layer composition: a) | Example of Bearing Substrate | Specification of Bearing Substrate | | | | Test Result | |
|---|---|---|---|---|---|---|---|
| | | Material | Main component | Copper content wt % | Theoretical density ratio of material | Cracks in bearing substrate upon insert molding | Shear bond strength MPa |
| Embodiment 1 | A | Sintered alloy | Iron | 5 | 0.70 | ○ | 5.3 |
| Embodiment 2 | B | Sintered alloy | Iron | 5 | 0.72 | ○ | 4.7 |
| Embodiment 3 | C | Sintered alloy | Iron | 5 | 0.84 | ○ | 3.0 |
| Embodiment 4 | D | Sintered alloy | Iron | 5 | 0.89 | ○ | 2.2 |
| Embodiment 5 | E | Sintered alloy | Iron | — | 0.79 | ○ | 3.8 |
| Embodiment 6 | F | Sintered alloy | Iron | 35 | 0.78 | | 3.0 |
| Embodiment 7 | G | Sintered alloy | Iron | 10 | 0.78 | ○ | 3.6 |
| Embodiment 8 | H | Sintered alloy | Copper | Main component | 0.73 | ○ | 3.2 |
| Embodiment 9 | I | Sintered alloy | Iron | 5 | 0.93 | ○ | 1.5 |

TABLE 4-continued

| Embodiment No. (resin layer composition: a) | Example of Bearing Substrate | Specification of Bearing Substrate | | | | Test Result | |
|---|---|---|---|---|---|---|---|
| | | Material | Main component | Copper content wt % | Theoretical density ratio of material | Cracks in bearing substrate upon insert molding | Shear bond strength MPa |
| Comparative Example 1 | J | Sintered alloy | Iron | 5 | 0.67 | X (Formation of resin layer by adhesion was possible) | — |
| Comparative Example 2 | K | Steel material (C45S) | Iron | — | 1 | ○ | 0.2 |

Cracks in bearing substrate upon insert molding
None: ○,
Present (1 or more): X (2) Seizure Resistance Test Using an oil immersion radial type tester, a seizure resistance test was performed on composite slide bearings (30 mm in inner diameter, 35 mm in outer diameter and 20 mm long) in which each of the resin layers of Table 2 and 3 was formed on the radially inner surface of the bearing substrate of Example E. In the test, running of each bearing was performed for 30 minutes while supplying oil under the conditions of Table 5. Then after discharging oil and stopping a fresh supply of oil, the bearing was operated until the bearing seized and the time period until seizure occurred was measured. It was determined that the bearing seized when the temperature of the bearing at its radially outer surface rose by 20° C., or the torque doubled.

The time period until seizure occurred for each example is shown in Tables 6 and 7. The seizure resistance test was performed on the following slide bearings as additional comparative examples.

Slide bearings made entirely of resin (30 mm in inner diameter, 35 mm in outer diameter and 20 mm long) which is formed by injection-molding the composition a of Table 2.

Three-layered composite slide bearings (30 mm in inner diameter, 35 mm in outer diameter and 20 mm long, and 0.05 mm in resin layer thickness) including a porous sintered layer having a metal backing and impregnated with a PTFE resin composition (containing 10% by volume of carbon fiber). When it was impossible to form a resin layer of Table 6 having a thickness described in Table 6 by insert molding, a thicker resin layer was formed by injection molding and finished to the predetermined thickness by machining.

(3) Wear Test

The same composite slide bearings used in the seizure resistance test were operated for 30 hours in an oil immersion radial type tester while supplying oil under the conditions shown in Table 5. Then the amount of wear was measured for each bearing.

TABLE 5

| Number of Revolution | 3000 rpm |
|---|---|
| Load | 10 kN |
| Oil | Idemitsu Daphne hermetic oil PS |
| Oil Temperature | 100° C. (circulating type) |
| Counterpart material | FCD600 |

(4) Melt Viscosity

Melt viscosity values were measured by a capillograph made by Toyo Seiki Seisakusho, Ltd. with a capillary of 1 mm in diameter and 10 mm long, at a resin temperature of 380° C. and a shear velocity of $1000\ s^{-1}$. These values are shown in Tables 6 and 7.

As is apparent from Table 4, no cracks developed in the bearing substrates of Examples 1 to 9 during insert molding. Their shear bond strength values were all 1.5 MPa or over. Among them, Examples 1 to 7, of which the sintered metal has a theoretical density ratio of 0.7 to 0.9, showed an especially high shear bond strength, i.e. 2 MPa or over.

For Comparative Example 1, of which the sintered metal has a theoretical density ratio of 0.67, cracks developed in the bearing substrate during insert molding. For the bearing of which the substrate was formed by machining a steel material, the shear bond strength was extremely low (Comparative Example 2).

TABLE 6

| | Embodiment No. | | | | | | | | | | | | |
|---|---|---|---|---|---|---|---|---|---|---|---|---|---|
| | 10 | 11 | 12 | 13 | 14 | 15 | 16 | 17 | 18 | 19 | 20 | 21 | 22 |
| Bearing Type | Composite slide bearing (bearing substrate: E) | | | | | | | | | | | | |
| Resin Layer Composition (signs in Table 2) | a | b | c | d | e | f | g | h | i | c | a | e | a |
| Resin Layer Thickness (mm) | 0.5 | 0.5 | 0.5 | 0.5 | 0.5 | 0.5 | 0.5 | 0.5 | 0.5 | 0.2 | 0.3 | 0.3 | 0.7 |
| Forming Method of Resin Layer | INJ | INJ | INJ | INJ | INJ | INJ + MAC | INJ | INJ | INJ | INJ | INJ | INJ + MAC | INJ |
| Seizure Time (min) | 85 | 33 | 56 | >120 | 79 | 62 | 52 | 44 | 60 | >120 | >120 | 110 | 47 |

TABLE 6-continued

| | Embodiment No. | | | | | | | | | | | | |
|---|---|---|---|---|---|---|---|---|---|---|---|---|---|
| | 10 | 11 | 12 | 13 | 14 | 15 | 16 | 17 | 18 | 19 | 20 | 21 | 22 |
| Wear Amount (μm) | 5 | 7 | 10 | 8 | 5 | 7 | 10 | 8 | 6 | 4 | 3 | 3 | 10 |
| Melt Viscosity of Resin Material (Pa·S) | 130 | 150 | 110 | 150 | 180 | 500 | 140 | 135 | 140 | 110 | 130 | 180 | 130 |
| Formation of Resin Layer in Insert Molding | ○ | ○ | ○ | ○ | ○ | X | ○ | ○ | ○ | ○ | ○ | X | ○ |
| Formation of Resin Layer by Adhesion or Press-fitting | ○ | ○ | ○ | ○ | ○ | ○ | ○ | ○ | ○ | ○ | ○ | ○ | ○ |

Forming method of resin layer
Insert molding: INJ,
Machining after insert forming: MAC
Formation of resin layer
○: Possible,
X: Impossible

TABLE 7

| | Comparative Example No. | | | | | | | | | | |
|---|---|---|---|---|---|---|---|---|---|---|---|
| | 3 | 4 | 5 | 6 | 7 | 8 | 9 | 10 | 11 | 12 | 13 |
| Bearing Type | Composite slide bearing (bearing substrate: E) | | | | | | | | | Bearing made entirely of resin | Three-layered composite slide bearing |
| Resin Layer Composition (signs in Tables 2 and 3) | j | k | l | m | n | o | p | q | a | — | — |
| Resin Layer Thickness (mm) | 0.5 | 0.5 | 0.5 | 0.5 | 0.5 | 0.5 | 0.5 | 0.5 | 1 | (2.5) | (0.05) |
| Forming Method of Resin Layer | INJ + MAC | INJ | INJ | INJ | INJ | INJ + MAC | INJ | INJ + MAC | INJ | — | — |
| Seizure Time (min) | 8 | 21 | 23 | 20 | 19 | <1 | 26 | Immeasurable | <1 | Immeasurable | <1 |
| Wear Amount (μm) | 27 | 35 | 57 | 39 | 23 | 33 | 42 | Abnormal wear | 78 | Abnormal wear | 30 |
| Melt Viscosity of Resin Material (Pa·S) | 230 | 110 | 140 | 135 | 140 | 210 | 125 | 420 | 130 | — | — |
| Formation of Resin Layer in Insert Molding | X | ○ | ○ | ○ | ○ | ○ | X | X | ○ | — | — |
| Formation of Resin Layer by Adhesion or Press-fitting | ○ | ○ | ○ | ○ | ○ | ○ | ○ | ○ | ○ | — | — |

Forming method of resin layer
Insert molding: INJ,
Machining after insert forming: MAC
Formation of resin layer
○: Possible,
X: Impossible Any of the layers of Table 7 which could not be formed to the thickness shown in Table 7 by insert molding, a thicker resin layer was formed by injection molding and then finished to the predetermined thickness by machining. Comparative Examples 10 and 12 became worn abnormally within the initial 30 minutes. Thus, it was impossible to perform the seizure resistance test on these examples.

As shown in Table 6, Examples 10 to 22 were all excellent both in seizure resistance and wear resistance. In particular, for these examples, it took 30 minutes or longer until seizure occurred, and the wear amounts were all 10 μm or less. For Examples 10-14, 16-20 and 22, of which the melt viscosity is 200 Pa·s at the resin temperature of 380° C. and the shear rate of 1000 s$^{-1}$, the required resin layer can be formed by insert molding.

As shown in Table 7, for conventional bearings of Comparative Examples 12 and 13 (bearing made entirely of resin and three-layered composite slide bearing), seizure occurred in less than a minute, and the wear amounts were large too.

For Comparative Examples 3 to 10, which are all composite slide bearings but of which the resin layer has a composition outside of the claimed range, seizure occurred in a short time, i.e. in less than 26 minutes, and the wear amounts were large too.

For composite slide bearings of which the resin layer has a composition within the claimed range but has a thickness exceeding 0.7 mm, seizure occurred in less than a minute and the wear amounts were extremely large too.

What is claimed is:

1. A composite slide bearing comprising:
   a substrate made of a sintered metal; and
   a resin layer fixedly superposed on the substrate;
   wherein the resin layer is an injection-molded resin layer having a resin composition comprising an aromatic polyetherketone resin and a fibrous filler dispersed in the aromatic polyetherketone resin and is finished to a required resin thickness by machining after injection molding,
   wherein the fibrous filler comprises fibers which are oriented such that a length direction of each of the fibers intersects a rotational direction of the bearing at an angle of 45 to 90 degrees, and
   wherein the resin layer has a thickness of 0.1 to 0.7 mm.

2. The composite slide bearing of claim 1, wherein the resin layer is superposed on the substrate by injection molding.

3. The composite slide bearing of claim 2, wherein the resin layer has a thickness which is one-eighth to a half of a thickness of the substrate in a radial direction of the bearing.

4. The composite slide bearing of claim 1, wherein the resin layer has a thickness which is one-eighth to a half of a thickness of the substrate in a radial direction of the bearing.

5. The composite slide bearing of claim 1, the fibers forming the fibrous filler have an average length of 0.02 to 0.2 mm.

6. The composite slide bearing of claim 1, wherein the substrate has a theoretical density ratio of 0.7 to 0.9.

7. The composite slide bearing of claim 1, wherein the resin composition has a melt viscosity of 50 to 200 Pa·s at a resin temperature of 380° C. and at a shear rate of 1000 $s^{-1}$.

8. The composite slide bearing of claim 1, wherein the resin composition comprises, as essential components, 5 to 30% by volume of carbon fiber, and 1 to 30% by volume of Tetrafluoroethylene, the balance being an aromatic polyetherketone.

9. The composite slide bearing of claim 8, wherein the carbon fiber is PAN carbon fiber.

10. The composite slide bearing of claim 1, wherein the substrate is a cylindrical member, and
    wherein the resin layer is formed on at least one of a radially inner surface of the substrate, a radially outer surface of the substrate, and end surfaces of the substrate.

11. The composite slide bearing of claim 10, which is a liquid-lubricated slide bearing lubricated by oil or grease.

12. The composite slide bearing of claim 1, wherein the substrate is a cylindrical member having a flange, the flange having an end surface which is transverse to and extends from a side wall of the cylindrical member, and
    wherein the resin layer is formed on the side wall and the end surface of the cylindrical member.

13. The composite slide bearing of claim 12, wherein the resin layer has a thickness which is one-eighth to a half of a thickness of the substrate in a radial direction of the bearing.

14. The composite slide bearing of claim 12, wherein the resin composition has a melt viscosity of 50 to 200 Pa·s at a resin temperature of 380° C. and at a shear rate of 1000 $s^{-1}$.

15. The composite slide bearing of claim 12, wherein the resin composition comprises, as essential components, 5 to 30% by volume of carbon fiber, and 1 to 30% by volume of Tetrafluoroethylene, the balance being an aromatic polyetherketone.

16. The composite slide bearing of claim 1, wherein the resin layer has a thickness which is one-eighth to a half of a thickness of the substrate in a radial direction of the bearing,
    wherein the fibers forming the fibrous filler have an average length of 0.02 to 0.2 mm,
    wherein the resin composition has a melt viscosity of 50 to 200 Pa·s at a resin temperature of 380° C. and at a shear rate of 1000 $s^{-1}$, and
    wherein the resin composition comprises 5 to 30% by volume of carbon fiber and 1 to 30% by volume of Tetrafluoroethylene, the balance being an aromatic polyetherketone.

17. A composite slide bearing comprising:
    a substrate made of a sintered metal; and
    a resin layer fixedly superposed on the substrate;
    wherein the resin layer is an injection-molded resin layer comprising a resin composition comprising an aromatic polyetherketone resin and a fibrous filler dispersed in the aromatic polyetherketone resin and is finished to a required resin thickness by machining after injection molding,
    wherein the fibrous filler comprises fibers which are oriented such that a length direction of each of the fibers intersects a rotational direction of the bearing at an angle of 80 to 90 degrees, and
    wherein the resin layer has a thickness of 0.1 to 0.7 mm.

18. A composite slide bearing comprising:
    a substrate made of a sintered metal; and
    a resin layer fixedly superposed on the substrate;
    wherein the resin layer is an injection-molded resin layer comprising a resin composition comprising an aromatic polyetherketone resin and a fibrous filler dispersed in the aromatic polyetherketone resin and is finished to a required resin thickness by machining after injection molding,
    wherein the fibrous filler comprises fibers which are oriented such that a length direction of each of the fibers intersects a rotational direction of the bearing at an angle of 80 to 90 degrees,
    wherein the resin layer has a thickness of 0.1 to 0.7 mm,
    wherein the resin layer has a thickness which is one-eighth to a half of a thickness of the substrate in a radial direction of the bearing,
    wherein the fibers forming the fibrous filler have an average length of 0.02 to 0.2 mm,
    wherein the resin composition has a melt viscosity of 50 to 200 Pa·s at a resin temperature of 380° C. and at a shear rate of 1000 $s^{-1}$, and
    wherein the resin composition comprises 5 to 30% by volume of carbon fiber and 1 to 30% by volume of Tetrafluoroethylene, the balance being an aromatic polyetherketone.

* * * * *